(12) United States Patent
King et al.

(10) Patent No.: US 12,157,690 B2
(45) Date of Patent: Dec. 3, 2024

(54) COLD TEMPERATURE-RESISTANT MICROBIALS AND METHODS OF THEIR USE

(71) Applicant: MICROBIAL DISCOVERY GROUP LLC, Franklin, WI (US)

(72) Inventors: Michael R. King, Oak Creek, WI (US); Sona Son, Franklin, WI (US)

(73) Assignee: MICROBIAL DISCOVERY GROUP LLC, Franklin, WI (US)

( * ) Notice: Subject to any disclaimer, the term of this patent is extended or adjusted under 35 U.S.C. 154(b) by 0 days.

(21) Appl. No.: 15/374,074

(22) Filed: Dec. 9, 2016

(65) Prior Publication Data

US 2017/0166466 A1    Jun. 15, 2017

Related U.S. Application Data

(60) Provisional application No. 62/265,295, filed on Dec. 9, 2015.

(51) Int. Cl.
*C02F 3/34*     (2023.01)
*C02F 101/30*   (2006.01)
(Continued)

(52) U.S. Cl.
CPC .............. *C02F 3/341* (2013.01); *C02F 3/34* (2013.01); *C02F 3/342* (2013.01);
(Continued)

(58) Field of Classification Search
CPC .. C02F 3/341; C02F 3/34; C02F 3/342; C02F 2101/306; C02F 2103/023; C02F 2103/10; C02F 2103/24; C02F 2103/28; C02F 2103/327; C02F 2103/34; C02F 2103/343; C02F 2101/30; C02F 2101/363; C02F 3/108; A61K 2300/00; A61K 31/4178; A61K 31/496; A61K 31/704; A61K 31/7048; A61K 35/36; A61K 35/74; A61K 35/742; A61K 45/06; A61K 47/44;
(Continued)

(56) References Cited

U.S. PATENT DOCUMENTS 4,673,638 A    6/1987  Grosch et al.
5,587,475 A    12/1996 Helquist et al.
(Continued)

FOREIGN PATENT DOCUMENTS

CA    2948832      11/2015
CN    101159102    4/2008
(Continued)

OTHER PUBLICATIONS

Sumi et al., Antimicrobial peptides of the genus *Bacillus*: a new era for antibiotics, Nov. 19, 2014, p. 1-7 (Year: 2014).*
(Continued)

*Primary Examiner* — Fred Prince
(74) *Attorney, Agent, or Firm* — Barnes & Thornburg LLP

(57) ABSTRACT

The invention relates to cold temperature-resistant microbials for use in waste water treatment. More particularly, the invention relates to isolated *Bacillus* strains ALG and DRT, and strains having all of the identifying characteristics of these strains, and combinations thereof, for a use comprising the above-mentioned use.

36 Claims, 4 Drawing Sheets

(51) Int. Cl.
*C02F 103/02* (2006.01)
*C02F 103/10* (2006.01)
*C02F 103/24* (2006.01)
*C02F 103/28* (2006.01)
*C02F 103/32* (2006.01)
*C02F 103/34* (2006.01)

(52) U.S. Cl.
CPC .. *C02F 2101/306* (2013.01); *C02F 2103/023* (2013.01); *C02F 2103/10* (2013.01); *C02F 2103/24* (2013.01); *C02F 2103/28* (2013.01); *C02F 2103/327* (2013.01); *C02F 2103/343* (2013.01)

(58) Field of Classification Search
CPC . A61K 8/73; A61K 8/925; A61K 8/99; A61K 9/0014; A61K 9/0034; A61K 9/0046; C08J 11/105; C08J 2323/06; C08J 11/10; C12N 1/20; C12N 1/26; C12N 1/205; C12R 1/07; A01N 63/00; A61L 15/36; A61P 17/00; A61P 31/00; A61P 31/02; A61P 31/04; A61P 31/10; A61P 31/12; A61Q 19/00; A61Q 19/001; B01D 2201/12; B01D 2201/291; B01D 2201/316; B01D 2201/4046; B01D 2201/4053; B01D 2201/4084; B01D 29/33; B01D 29/54; B01D 29/58; B01D 35/1475; B01D 35/30; B01D 36/003; B01D 36/006; B09C 1/10; F02M 37/26; F02M 37/42; Y02A 50/30; Y02A 50/473; Y02W 10/10; Y02W 10/15; Y02W 30/62; Y10S 514/887
USPC .................................................. 210/601, 606
See application file for complete search history.

(56) References Cited

U.S. PATENT DOCUMENTS

| | | | |
|---|---|---|---|
| 5,589,381 | A | 12/1996 | Neyra et al. |
| 5,665,354 | A | 9/1997 | Neyra |
| 6,268,147 | B1 | 7/2001 | Beattie |
| 7,754,469 | B2 | 7/2010 | Baltzley et al. |
| 7,807,185 | B2 * | 10/2010 | Farmer ................ A61P 17/00 424/93.46 |
| 8,025,874 | B2 | 9/2011 | Bellot et al. |
| 8,540,981 | B1 | 9/2013 | Wehnes et al. |
| 9,175,258 | B2 | 11/2015 | Bywater-Ekegard |
| 9,410,213 | B2 | 8/2016 | Matheny |
| 9,758,414 | B2 | 9/2017 | Dash et al. |
| 10,961,275 | B2 | 3/2021 | Bralkowski et al. |
| 2001/0027947 | A1 * | 10/2001 | Tsuchiya ................ B09C 1/10 210/601 |
| 2005/0255092 | A1 | 11/2005 | Rehberger et al. |
| 2005/0266468 | A1 | 12/2005 | Bedzyk |
| 2006/0188978 | A1 | 8/2006 | Grant |
| 2008/0050774 | A1 | 2/2008 | Berka |
| 2009/0280090 | A1 | 11/2009 | Rehberger et al. |
| 2010/0010080 | A1 | 1/2010 | Mockett et al. |
| 2010/0062021 | A1 | 3/2010 | Winkelman |
| 2010/0092428 | A1 | 4/2010 | Schmidt et al. |
| 2010/0291564 | A1 | 11/2010 | Stanley |
| 2012/0100118 | A1 | 4/2012 | Rehberger et al. |
| 2012/0015259 | A1 | 12/2012 | Friedlander et al. |
| 2012/0315258 | A1 | 12/2012 | Rehberger et al. |
| 2012/0315259 | A1 | 12/2012 | Friedlander et al. |
| 2013/0064927 | A1 | 3/2013 | Davis et al. |
| 2013/0098837 | A1 | 4/2013 | Dash |
| 2013/0100118 | A1 | 4/2013 | Mlyniec et al. |
| 2013/0136695 | A1 | 5/2013 | Hargis et al. |
| 2013/0216586 | A1 | 8/2013 | LeBrun et al. |
| 2013/0295067 | A1 | 11/2013 | Baltzley et al. |
| 2014/0106974 | A1 | 4/2014 | Sun et al. |
| 2014/0141044 | A1 | 5/2014 | Dana-Farber |
| 2014/0273150 | A1 | 9/2014 | Angel |
| 2014/0315716 | A1 * | 10/2014 | Matheny ................ C02F 3/34 435/252.4 |
| 2014/0363819 | A1 | 12/2014 | Rowlyk |
| 2015/0079058 | A1 | 3/2015 | Nielsen et al. |
| 2015/0111214 | A1 | 4/2015 | Liu |
| 2015/0147303 | A1 * | 5/2015 | Hsieh ................ A23B 7/155 424/93.46 |
| 2015/0216203 | A1 | 8/2015 | Dupont |
| 2015/0216916 | A1 | 8/2015 | Dupont |
| 2016/0108467 | A1 | 4/2016 | Semikhodskii et al. |
| 2017/0079308 | A1 | 3/2017 | King et al. |
| 2017/0166466 | A1 | 6/2017 | King et al. |
| 2017/0246224 | A1 | 8/2017 | King et al. |
| 2017/0327840 | A1 | 11/2017 | Bayer |
| 2018/0361444 | A1 | 12/2018 | Franssen |
| 2019/0021341 | A1 | 1/2019 | Church et al. |
| 2020/0015497 | A1 | 1/2020 | King et al. |
| 2020/0029592 | A1 | 1/2020 | King et al. |
| 2020/0093158 | A1 | 3/2020 | Calabotta et al. |

FOREIGN PATENT DOCUMENTS

| | | | |
|---|---|---|---|
| CN | 102223809 | 10/2011 | |
| CN | 103980535 | 8/2014 | |
| CN | 107841478 | 3/2018 | |
| CN | 109497281 | 3/2019 | |
| EP | 1574564 | 9/2005 | |
| GB | 1392813 A | * 4/1975 | ............ C01B 17/10 |
| GB | 1434582 | 5/1976 | |
| JP | 3417904 | 6/2003 | |
| KR | 100427600 | 4/2004 | |
| WO | 2007083147 | 7/2007 | |
| WO | 2010032233 | 3/2010 | |
| WO | 2010033714 | 3/2010 | |
| WO | 2012/009712 | 1/2012 | |
| WO | 2012/101528 | 8/2012 | |
| WO | 2014/020141 | 2/2014 | |
| WO | 2014/067081 | 5/2014 | |
| WO | 2014/0172520 | 10/2014 | |
| WO | 2015/057330 | 4/2015 | |
| WO | 2015/160960 | 10/2015 | |
| WO | 2015/175667 | 11/2015 | |
| WO | 2017/081105 | 5/2017 | |
| WO | 2017/151608 | 9/2017 | |
| WO | 2018/148847 | 8/2018 | |
| WO | 2019090068 | 5/2019 | |
| WO | 2019090088 | 5/2019 | |
| WO | 2019/141815 | 7/2019 | |
| WO | 2019/152791 | 8/2019 | |
| WO | 2019/213243 | 11/2019 | |
| WO | 2020072578 | 4/2020 | |
| WO | 2021035137 | 2/2021 | |
| WO | 2021041603 | 3/2021 | |
| WO | 2023018686 | 2/2023 | |

OTHER PUBLICATIONS

EPA, Final Risk Assessment of Bacillus Subtilis, Feb. 1997, p. 3, 9 (Year: 1997).*
Karigar et al., "Role of Microbial Enzymes in the Bioremediation of Pollutants: A Review," Enzyme Research, vol. 2011, Article ID 805187, 11 pages.
Schmidt et al., "New Concepts of microbial treatment processes for the nitrogen removal in wastewater," 2003.
Ramachandran et al., "A Broad-Spectrum Antimicrobial Activity of Bacillus subtilis RLID 12.1," 2014.
Kiarie et al. "The Role of Added Feed Enzymes in Promoting Gut Health in Swine and Poultry," Nutrition Research Reviews, Jun. 1, 2013 (Jun. 1, 2013), vol. 26, pp. 71-88. Entire document.
La Ragione et al. "Bacillus subtilis Spores Competitively Exclude *Escherichia coli* O78: K80 in Poultry," Veterinary Microbiology, Mar. 20, 2001 (Mar. 20, 2001). vol. 79, pp. 133-142. Entire document.

(56) References Cited

OTHER PUBLICATIONS

Harnentis et al. "Isolation, Characterization and Production of Mannanase from Thermophilic Bacteria to Increase the Feed Quality," Pakistan Journal of Nutrition 12 (4): 360-364, 2013.
PCT Search Report and Written Opinion for PCT/US2015/030578, completed Jul. 9, 2015.
Extended European Search Report, European Application No. 15792802.9-1358 dated Nov. 8, 2017, 8 pages.
Souza et al. J. Anim. Sci. vol. 90, Suppl. 3/J. Dairy Sci. vol. 95, Suppl. 2 T281.
Credille et al. (2014). Prevalence of bacteremia in dairy cattle with acute puerperal metritis. J Vet Intern Med, 28:1606-1612.
Sheldon et al. (2009). Defining postpartum uterine disease and the mechanisms of infection and immunity in the female reproductive tract in cattle. Biol Reprod 81:1025-1032.
Abutarbush et al. (2005). Jejunal hemorrhage syndrome in dairy and beef cattle: 11 cases (2001 to 2003). Can. Vet. J. Rev. Vét. Can. 46, 711-715.
Abutarbush et al. (2004). Jejunal hemorrhage syndrome in 2 Canadian beef cows. Can. Vet. J. 45, 48-50.
Adaska et al. (2014). Jejunal hematoma in cattle: a retrospective case analysis. J. Vet. Diagn. Investig. Off. Publ. Am. Assoc. Vet. Lab. Diagn. Inc 26, 96-103.
Baines et al. (2011). Mouldy feed, mycotoxins and Shiga toxin—producing *Escherichia coli* colonization associated with Jejunal Hemorrhage Syndrome in beef cattle. BMC Vet. Res. 7, 24.
Ceci, L., Paradies, P., Sasanelli, M., De Caprariis, D., Guarda, F., Capucchio, M. t., and Carelli, G. (2006). Haemorrhagic Bowel Syndrome in Dairy Cattle: Possible Role of Clostridium perfringens Type A in the Disease Complex. J. Vet. Med. Ser. A 53, 518-523.
Dennison et al. (2002). Hemorrhagic bowel syndrome in dairy cattle: 22 cases (1997-2000). J. Am. Vet. Med. Assoc. 221, 686-689.
Dennison et al. (2005). Comparison of the odds of isolation, genotypes, and in vivo production of major toxins by Clostridium perfringens obtained from the gastrointestinal tract of dairy cows with hemorrhagic bowel syndrome or left-displaced abomasum. J. Am. Vet. Med. Assoc. 227, 132-138.
Malinen et al. (2003). Comparison of real-time PCR with SYBR Green I or 5 '-nuclease assays and dot-blot hybridization with rDNA-targeted oligonucleotide probes in quantification of selected faecal bacteria. Microbiology. 149: 269-277.
West et al. (2007) Rapid Detection of *Escherichia coli* Virulence Factor Genes using Multiplex Real-Time TaqMan®PCR Assays. Veterinary Microbiology 122(3-4): 323-331.
Frydendahl et al. (2001). Automated 5' nuclease assay for detection of virulence factors in porcine *Escherichia coli*. Molec.Cell, Probes. 15: 151-160.
Nielsen et al. (2003). Detection and characterization of verocytotoxin-producing *Escherichia coli* by automated 5 nuclease PCR assay, Journal of ClinicalMicrobiology, vol. 41, No. 7, pp. 2884-2893.
Jinneman et al. (2003). Multiplex Real-Time PCR Method To Identify Shiga Toxin Genes stx1 and stx2 and *Escherichia coli* O157:H7/H-Serotype. Appl. Environ. Microbiol. Oct. 2003 vol. 69 No. 10 6327-6333.
Yatsuyanagi et al. (2002). Characterization of enteropathogenic and enteroaggregative *Escherichia coli* isolated from diarrheal outbreaks, Journal of Clinical Microbiology, vol. 40, No. 1, pp. 294-297.
Albini et al. (2010). Real-time multiplex PCR assays for reliable detection of Clostridium perfringens toxin genes in animal isolates, Veterinary Microbiology, 127 (1-2): 179-185.
Johnson et al. (2012). A MIQE-Compliant Real-Time PCR Assay for Aspergillus Detection., PLOSone., 7(7): 1-8.
Miller et al., "Sanitary Landfill Simulation: Test Parameters and a Simulator Conceptual Design," Naval Facilities Engineering Command: Civil Engineering Laboratory, Oct. 20, 1976 (Oct. 20, 1976), pp. 1-47. Retrieved from the Internet: <https://apps.dtic.mil/dtic/tr/fulltext/u2/a030998.pdf>.
Fei et al., "A laboratory landfill simulator for physical, geotechnical, chemical and microbial characterization of solid waste biodegradation processes," Couples Phenomena in Environmental Geotechnics, May 20, 2013 (May 30, 2013), Taylor & Francis Group, London, pp. 321-327.
Mahar et al., "Modeling and simulation of landfill gas production from pretreated MSW landfill simulator," Frontiers of Environmental Science & Engineering, Apr. 15, 2014 (Apr. 15, 2014), vol. 10, Iss. 1, pp. 159-167.
Canning, et al., "Effect of direct-fed microbial Bacillus subtilis C-3102 on enteric health in nursery pigs after challenge with porcine epidemic diarrhea virus," Journal of Swine Health and Production, May 3, 2017, 25(3): 129-137.
Peng, et al., "Evaluation of antiviral activity of Bacillus licheniformis-fermented products against porcine epidemic diarrhea virus," AMB Express, Dec. 3, 2019, 9(191): 1-12.
Bae H.D., Yanke L.J, Cheng K.J., Selinger L.B., 1999, "A novel staining method for detecting phytase activity," Journal of Microbiological Methods, 39:1, 17-22.
Zganjer, et al. "Treatment of rectal prolapse in children with cow milk injection sclerotherapy: 30-year experience," World Journal of Gastroanterology, 2008, 14(5) 740-7.
Rajendram et al., Journal of Microbiological Methods, 2006, 67, 582-92.
Krishnani, Genbank entry KJ000877 published Feb. 2014.
Lowe, et al., Nucleic Acids Research, 1990, 18(7) 1757-61.
Mcclure et al. "Assessment of DNA extracted from FTA® cards for use on the Illumina iSelect Beach Chip," BMC Research Notes, 2009, 2(107) 4 pages.
Haldar et al., "Development of a haemolysin gene-based multiplex PCR for simultaneous detection of Vibrio campbelli, Vibrio harveyi and Vibrio parahaemolyticus," Letters in Applied Microbiology, 2010, 50, 146-52.
EP Search report in EP 16789853 completed Aug. 8, 2018.
International search report and written opinion for PCT/US2017/019941, mailed May 26, 2017.
International search report and written opinion for PCT/US2018/058948, mailed Jan. 18, 2019.
International Search Report prepared for PCT/US2020/048101 mailed Jan. 22, 2021.
International Search Report prepared for PCT/US2020/047390 , mailed Jan. 21, 2021.
Sonune et al. "Isolation, characterization and identification of extracellular enzyme producer Bacillus licheniformis from municipal wastewater and evaluation of the biodegradability," Biotechnology Research and Innovation, Jan-Dec. 2018, vol. 2, No. 1 pp. 37-44.
Safitri et al. "Ability of Bacterial Consortium: Bacillus coagulans, Bacilus licheniformis, Bacillus pumilus, Bacillus subtilis, *Nitrosomonas* sp. and Pseudomonas putida in Bioremediation of Waste Water in Cisirung Waste Water Treatment Plant," AgroLife Scientific Journal, 2015, vol. 4, No. 1, pp. 146-152.
Ou et al. "Identification of HIV-1 infected infants and young children using real-time RT PCR and dried blood spots from Uganda and Cameroon," Journal of Virological Methods, 2007, 144, 109-14.
Dobbs et al , 2002 Arch Pathol Lab Med. vol. 126, p. 56-63.
Chen et al, 2013 J of Proteome Research, 12, p. 1151-1161.
International search report and written opinion for PCT/US2019/030182, mailed Aug. 8, 2019.
Choudhary et al 2009 (interactions of *Bacillus* supp. and plants—with special reference to induced systemic resistance (ISR): Microbiologial Research 164: 493-513).
International search report and written opinion for PCT/US2020/023586, mailed May 20, 2020.
European Search Report, European Application No. 20855232.3-1105 dated Aug. 31, 2023, 8 pages.
Supp. European Search Report, European Application No. 20858946, dated Aug. 23, 2023.
Sonune et al., "Isolation, characterization and identification of extracellular enzyme producer Bacillus licheniformis from municipal wastewater and evaluation of their biodegradability." Biotechnology Research and Innovation, vol. 2, No. 1, Jan. 1, 2018, pp. 37-44.

(56) References Cited

OTHER PUBLICATIONS

Cohn et al., "Bacillus Strains Improving Health and Performance of Production Animals." IP.com, IP.COM Inc., Feb. 11, 2016, p. 36, line 54.

* cited by examiner

COLD TEMPERATURE-RESISTANT MICROBIALS AND METHODS OF THEIR USE

CROSS REFERENCE TO RELATED APPLICATIONS

This application claims priority to U.S. Provisional Application No. 62/265,295 filed Dec. 9, 2015 the disclosure of which are hereby expressly incorporated by reference in its entirety, respectively.

FIELD OF THE DISCLOSURE

The invention relates to cold temperature-resistant microbial strains for use in wastewater treatment. More particularly, the invention relates to isolated *Bacillus* strains ALG and DRT, and strains having all of the identifying characteristics of these strains, and combinations thereof, for a use comprising the above-mentioned use.

BACKGROUND AND SUMMARY OF THE INVENTION

The present invention relates to cold temperature-resistant microorganisms for use in wastewater treatment (e.g., industrial wastewater and sewage), and methods of their use for treatment of wastewater. The ability of microbial strains, such as *Bacillus* strains, to produce beneficial enzymes, and their antimicrobial activity and environmental compatibility, have led to the use of these microbial strains in wastewater treatment. For example, beneficial microbial strains can be used to reestablish the balance of bacteria beneficial to the environment, degrade harmful organic compounds in wastewater, or remove pollutants, such as inorganic pollutants (e.g., nitrogen or sulfur) from wastewater.

Microbial strains effective for use in wastewater treatment should be active at a variety of temperatures, in particular cold temperatures. For example, as little as a ten degree drop in temperature can bring about as much as a 50% loss in microbial activity. To maintain microbial strain activity for wastewater treatment during colder periods, it is important to use cold temperature-resistant microorganisms that will be active at lower temperatures. Many commercial microbial strains, or strain combinations, do not work well at low temperatures (e.g., 4° C.-10° C.). Thus, microbial strains, or strain combinations, are needed that are active even at the low temperatures often encountered during the wastewater treatment process.

Applicants have developed *Bacillus* strains, and combinations thereof, that remain active at low temperatures. In one embodiment a method of treating wastewater to remove a pollutant is provided. The method comprises contacting the wastewater with an effective amount of an isolated *Bacillus* strain selected from the group consisting of *Bacillus* strain ALG (NRRL No. B-67134), a strain having all of the identifying characteristics of *Bacillus* strain ALG (NRRL No. B-67134), *Bacillus* strain DRT (NRRL No. B-67135), a strain having all of the identifying characteristics of *Bacillus* strain DRT (NRRL No. B-67135), and combinations thereof, and removing the pollutant.

In another embodiment, a method of controlling a detrimental effect of wastewater is provided. The method comprises contacting the wastewater with an effective amount of an isolated *Bacillus* strain selected from the group consisting of *Bacillus* strain ALG (NRRL No. B-67134), a strain having all of the identifying characteristics of *Bacillus* strain ALG (NRRL No. B-67134), *Bacillus* strain DRT (NRRL No. B-67135), a strain having all of the identifying characteristics of *Bacillus* strain DRT (NRRL No. B-67135), and combinations thereof, and controlling the detrimental effect of the wastewater.

In various other embodiments, a commercial package, an additive for wastewater, and a composition are provided. The commercial package, additive for wastewater, and composition comprise an isolated *Bacillus* strain selected from the group consisting of *Bacillus* strain ALG (NRRL No. B-67134), a strain having all of the identifying characteristics of *Bacillus* strain ALG (NRRL No. B-67134), *Bacillus* strain DRT (NRRL No. B-67135), a strain having all of the identifying characteristics of *Bacillus* strain DRT (NRRL No. B-67135), and combinations thereof.

The following clauses, and combinations thereof, provide various additional illustrative aspects of the invention described herein. The various embodiments described in any other section of this patent application, including the section titled "DETAILED DESCRIPTION OF ILLUSTRATIVE EMBODIMENTS" and the EXAMPLES are applicable to any of the following embodiments of the invention described in the numbered clauses below.

1. A method of treating wastewater to remove a pollutant, the method comprising contacting the wastewater with an effective amount of an isolated *Bacillus* strain selected from the group consisting of *Bacillus* strain ALG (NRRL No. B-67134), a strain having all of the identifying characteristics of *Bacillus* strain ALG (NRRL No. B-67134), *Bacillus* strain DRT (NRRL No. B-67135), and a strain having all of the identifying characteristics of *Bacillus* strain DRT (NRRL No. B-67135), and combinations thereof, and removing the pollutant.

2. The method of clause 1 wherein the wastewater is selected from the group consisting of industrial wastewater and sewage wastewater.

3. The method of clause 1 or 2 wherein the wastewater is selected from the group consisting of dairy pond wastewater, grease trap wastewater, sewage wastewater, industrial cooling water wastewater, tannery wastewater, wastewater from the manufacture of a pharmaceutical, wastewater from the manufacture of a pesticide, wastewater from the manufacture of paper, municipal wastewater, wastewater from the manufacture of oil or gas, plant wastewater, and wastewater from the manufacture of food.

4. The method of any one of clauses 1 to 3 wherein the pollutant is selected from the group consisting of a harmful microorganism, an organic compound, an inorganic compound, and combinations thereof.

5. The method of clause 4 wherein the pollutant is a harmful microorganism and the microorganism is killed.

6. The method of any one of clauses 1 to 5 wherein at least one of the *Bacillus* strains has antimicrobial activity.

7. The method of clause 6 wherein the antimicrobial activity is against bacteria selected from the group consisting of *E. coli, Salmonella, Staphylococcus, Enterococcus, Clostridia, Campylobacter*, and combinations thereof.

8. The method of clause 4 wherein the pollutant is an organic compound.

9. The method of clause 8 wherein the organic compound is removed by degradation.

10. The method of clause 8 wherein the organic compound is selected from the group consisting of a pharmaceutical, a pesticide, a by-product of a tannery process, a by-product of paper manufacture, a by-product of pesticide manufacture, a by-product of oil or gas manufacture, a by-product of food manufacture, and a by-product of human waste.

11. The method of clause 4 wherein the pollutant is an inorganic compound.

12. The method of clause 11 wherein the inorganic compound is nitrogen or sulfur.

13. The method of any one of clauses 1 to 12 wherein the *Bacillus* strain produces an enzyme selected from the group consisting of an a protease, an amylase, a xylanase, a cellulase, and combinations thereof.

14. The method of clause 13 wherein the enzyme is a cellulase and the cellulase is a carboxymethylcellulase.

15. The method of any one of clauses 1 to 14 further comprising treating the wastewater with another bacterial strain selected from the group consisting of another *Bacillus* strain, a lactic acid bacterial strain, and combinations thereof.

16. The method of any one of clauses 1 to 15 wherein the strain is *Bacillus* strain ALG (NRRL No. B-67134), or a strain having all of the identifying characteristics of *Bacillus* strain ALG (NRRL No. B-67134).

17. The method of any one of clauses 1 to 15 wherein the strain is *Bacillus* strain DRT (NRRL No. B-67135), or a strain having all of the identifying characteristics of *Bacillus* strain DRT (NRRL No. B-67135).

18. The method of any one of clauses 1 to 15 wherein the wastewater is treated with a composition comprising *Bacillus* strain ALG (NRRL No. B-67134), or a strain having all of the identifying characteristics of *Bacillus* strain ALG (NRRL No. B-67134), and *Bacillus* strain DRT (NRRL No. B-67135), or a strain having all of the identifying characteristics of *Bacillus* strain DRT (NRRL No. B-67135), in combination in a single composition.

19. The method of any one of clauses 1 to 15 wherein the wastewater is treated with *Bacillus* strain ALG (NRRL No. B-67134), or a strain having all of the identifying characteristics of *Bacillus* strain ALG (NRRL No. B-67134), and *Bacillus* strain DRT (NRRL No. B-67135), or a strain having all of the identifying characteristics of *Bacillus* strain DRT (NRRL No. B-67135), in combination in separate compositions.

20. The method of any one of clauses 1 to 19 wherein the effective amount of the *Bacillus* strain is about $1.0 \times 10^3$ CFU/liter of the wastewater to about $5.0 \times 10^{12}$ CFU/liter of the wastewater.

21. The method of any one of clauses 1 to 19 wherein the effective amount of the *Bacillus* strain is about $1.0 \times 10^3$ CFU/liter of the wastewater to about $1.0 \times 10^{10}$ CFU/liter of the wastewater.

22. The method of any one of clauses 1 to 19 wherein the effective amount is an amount greater than about $1.0 \times 10^3$ CFU/liter of the wastewater.

23. The method of any one of clauses 1 to 22 further comprising contacting the wastewater with an enzyme selected from the group consisting of a galactosidase, a protease, a lipase, an amylase, a hemicellulase, an arabinoxylanase, a xylanase, a cellulase, an NSPase, a phytase, and combinations thereof.

24. A method of controlling a detrimental effect of wastewater, the method comprising contacting the wastewater with an effective amount of an isolated *Bacillus* strain selected from the group consisting of *Bacillus* strain ALG (NRRL No. B-67134), a strain having all of the identifying characteristics of *Bacillus* strain ALG (NRRL No. B-67134), *Bacillus* strain DRT (NRRL No. B-67135), a strain having all of the identifying characteristics of *Bacillus* strain DRT (NRRL No. B-67135), and combinations thereof, and controlling the detrimental effect of the wastewater.

25. The method of clause 24 wherein the wastewater is selected from the group consisting of industrial wastewater and sewage wastewater.

26. The method of clause 24 or 25 wherein the wastewater is selected from the group consisting of dairy pond wastewater, grease trap wastewater, sewage wastewater, industrial cooling water wastewater, tannery wastewater, wastewater from the manufacture of a pharmaceutical, wastewater from the manufacture of a pesticide, wastewater from the manufacture of paper, wastewater from the manufacture of oil or gas, plant wastewater, municipal wastewater, and wastewater from the manufacture of food.

27. The method of any one of clauses 24 to 26 wherein the detrimental effect of the wastewater is caused by a pollutant selected from the group consisting of a harmful microorganism, an organic compound, an inorganic compound, and combinations thereof.

28. The method of clause 27 wherein the pollutant is a harmful microorganism and the microorganism is killed.

29. The method of any one of clauses 24 to 28 wherein at least one of the *Bacillus* strains has antimicrobial activity.

30. The method of clause 29 wherein the antimicrobial activity is against bacteria selected from the group consisting of *E. coli, Salmonella, Staphylococcus, Enterococcus, Clostridia, Campylobacter,* and combinations thereof.

31. The method of clause 27 wherein the pollutant is an organic compound.

32. The method of clause 31 wherein the organic compound is removed by degradation.

33. The method of clause 31 wherein the organic compound is selected from the group consisting of a pharmaceutical, a pesticide, a by-product of a tannery process, a by-product of paper manufacture, a by-product of pesticide manufacture, a by-product of oil or gas manufacture, a by-product of food manufacture, and a by-product of human waste.

34. The method of clause 27 wherein the pollutant is an inorganic compound.

35. The method of clause 35 wherein the inorganic compound is nitrogen or sulfur.

36. The method of any one of clauses 24 to 35 wherein the *Bacillus* strain produces an enzyme selected from the group consisting of an a protease, an amylase, a xylanase, a cellulase, and combinations thereof.

37. The method of clause 36 wherein the enzyme is a cellulase and the cellulase is a carboxymethylcellulase.

38. The method of any one of clauses 24 to 37 further comprising contacting the wastewater with another bacterial strain selected from the group consisting of another *Bacillus* strain, a lactic acid bacterial strain, and combinations thereof.

39. The method of any one of clauses 24 to 38 wherein the strain is *Bacillus* strain ALG (NRRL No. B-67134), or a strain having all of the identifying characteristics of *Bacillus* strain ALG (NRRL No. B-67134).

40. The method of any one of clauses 24 to 38 wherein the strain is *Bacillus* strain DRT (NRRL No. B-67135), or a strain having all of the identifying characteristics of *Bacillus* strain DRT (NRRL No. B-67135).

41. The method of any one of clauses 24 to 38 wherein the wastewater is contacted with a composition comprising *Bacillus* strain ALG (NRRL No. B-67134), or a strain having all of the identifying characteristics of *Bacillus* strain ALG (NRRL No. B-67134), and *Bacillus* strain DRT (NRRL No. B-67135), or a strain having all of the identifying characteristics of *Bacillus* strain DRT (NRRL No. B-67135), in combination in a single composition.

42. The method of any one of clauses 24 to 38 wherein the wastewater is contacted with *Bacillus* strain ALG (NRRL No. B-67134), or a strain having all of the identifying characteristics of *Bacillus* strain ALG (NRRL No. B-67134), and *Bacillus* strain DRT (NRRL No. B-67135), or a strain having all of the identifying characteristics of *Bacillus* strain DRT (NRRL No. B-67135), in combination in separate compositions.

43. The method of any one of clauses 24 to 42 wherein the effective amount of the *Bacillus* strain is about $1.0 \times 10^3$ CFU/liter of the wastewater to about $5.0 \times 10^{12}$ CFU/liter of the wastewater.

44. The method of any one of clauses 24 to 42 wherein the effective amount of the *Bacillus* strain is about $1.0 \times 10^3$ CFU/liter of the wastewater to about $1.0 \times 10^{10}$ CFU/liter of the wastewater.

45. The method of any one of clauses 24 to 42 wherein the effective amount is an amount greater than about $1.0 \times 10^3$ CFU/liter of the wastewater.

46. The method of any one of clauses 24 to 45 further comprising contacting the wastewater with an enzyme selected from the group consisting of a galactosidase, a protease, a lipase, an amylase, a hemicellulase, an arabinoxylanase, a xylanase, a cellulase, an NSPase, a phytase, and combinations thereof.

47. A commercial package comprising an isolated *Bacillus* strain selected from the group consisting of *Bacillus* strain ALG (NRRL No. B-67134), a strain having all of the identifying characteristics of *Bacillus* strain ALG (NRRL No. B-67134), *Bacillus* strain DRT (NRRL No. B-67135), a strain having all of the identifying characteristics of *Bacillus* strain DRT (NRRL No. B-67135), and combinations thereof.

48. An additive for wastewater comprising an isolated *Bacillus* strain selected from the group consisting of *Bacillus* strain ALG (NRRL No. B-67134), a strain having all of the identifying characteristics of *Bacillus* strain ALG (NRRL No. B-67134), *Bacillus* strain DRT (NRRL No. B-67135), a strain having all of the identifying characteristics of *Bacillus* strain DRT (NRRL No. B-67135), and combinations thereof.

49. A composition comprising an isolated *Bacillus* strain selected from the group consisting of *Bacillus* strain ALG (NRRL No. B-67134), a strain having all of the identifying characteristics of *Bacillus* strain ALG (NRRL No. B-67134), *Bacillus* strain DRT (NRRL No. B-67135), a strain having all of the identifying characteristics of *Bacillus* strain DRT (NRRL No. B-67135), and combinations thereof.

50. The commercial package, additive, or composition of any one of clauses 47 to 49 wherein the *Bacillus* strain causes degradation of an organic compound or removal of an inorganic compound in wastewater.

51. The commercial package, additive, or composition of any one of clauses 47 to 50 wherein the *Bacillus* strain inhibits a pathogen selected from the group consisting of *E. coli, Salmonella, Staphylococcus, Enterococcus, Campylobacter,* and *Clostridium.*

52. The commercial package, additive, or composition of any one of clauses 47 to 51 wherein the *Bacillus* strain is in the form of a concentrate.

53. The commercial package, additive, or composition of any one of clauses 47 to 51 wherein the *Bacillus* strain is in the form of a superconcentrate.

54. The commercial package, additive, or composition of any one of clauses 47 to 53 wherein the *Bacillus* strain is in dry form.

55. The commercial package, additive, or composition of any one of clauses 47 to 54 wherein the *Bacillus* strain is in pelleted form.

56. The commercial package, additive, or composition of any one of clauses 47 to 55 wherein the *Bacillus* strain is in a form for use in treatment of wastewater selected from the group consisting of dairy pond wastewater, grease trap wastewater, sewage wastewater, industrial cooling water wastewater, tannery wastewater, wastewater from the manufacture of a pharmaceutical, wastewater from the manufacture of a pesticide, wastewater from the manufacture of paper, municipal wastewater, wastewater from the manufacture of oil or gas, plant wastewater, and wastewater from the manufacture of food.

57. The commercial package, additive, or composition of any one of clauses 47 to 56 wherein the strain is in a form selected from the group consisting of a powder, a liquid, and a pellet form.

58. The commercial package, additive, or composition of any one of clauses 47 to 57 further comprising a carrier for the *Bacillus* strain.

59. The commercial package, additive, or composition of clause 58 wherein the carrier is selected from the group consisting of salt, a dextrin, and combinations thereof.

60. The commercial package, additive, or composition of any one of clauses 47 to 59 in a bag.

61. The commercial package, additive, or composition of clause 60 wherein the bag is a plastic bag.

62. The commercial package, additive, or composition of any one of clauses 47 to 61 further comprising instructions for use of one or more of the *Bacillus* strains.

63. The commercial package, additive, or composition of any one of clauses 47 to 62 in a 20-pound bag.

64. The commercial package, additive, or composition of any one of clauses 47 to 62 in a 50-pound bag.

65. The commercial package, additive, or composition of any one of clauses 47 to 54 or 56 to 64 wherein the *Bacillus* strain is in powder form.

66. The commercial package, additive, or composition of any one of clauses 47 to 53 or 56 to 62 wherein the *Bacillus* strain is in liquid form.

67. The commercial package, additive, or composition of any one of clauses 47 to 66 wherein the *Bacillus* strain is in a container for commercial use.

68. The commercial package, additive, or composition of clause 67 wherein the container comprises plastic.

69. The commercial package, additive, or composition of clause 67 wherein the container comprises paper.

70. The commercial package, additive, or composition of any one of clauses 47 to 69 further comprising a binder.

71. The commercial package, additive, or composition of clause 70 wherein the binder is selected from the group consisting of clay, yeast cell wall components, aluminum silicate, and glucan, or combinations thereof.

72. The method, commercial package, additive, or composition of any one of clauses 1 to 71 wherein the *Bacillus* strain retains activity at a temperature as low as 4° C.

Figure 1A:
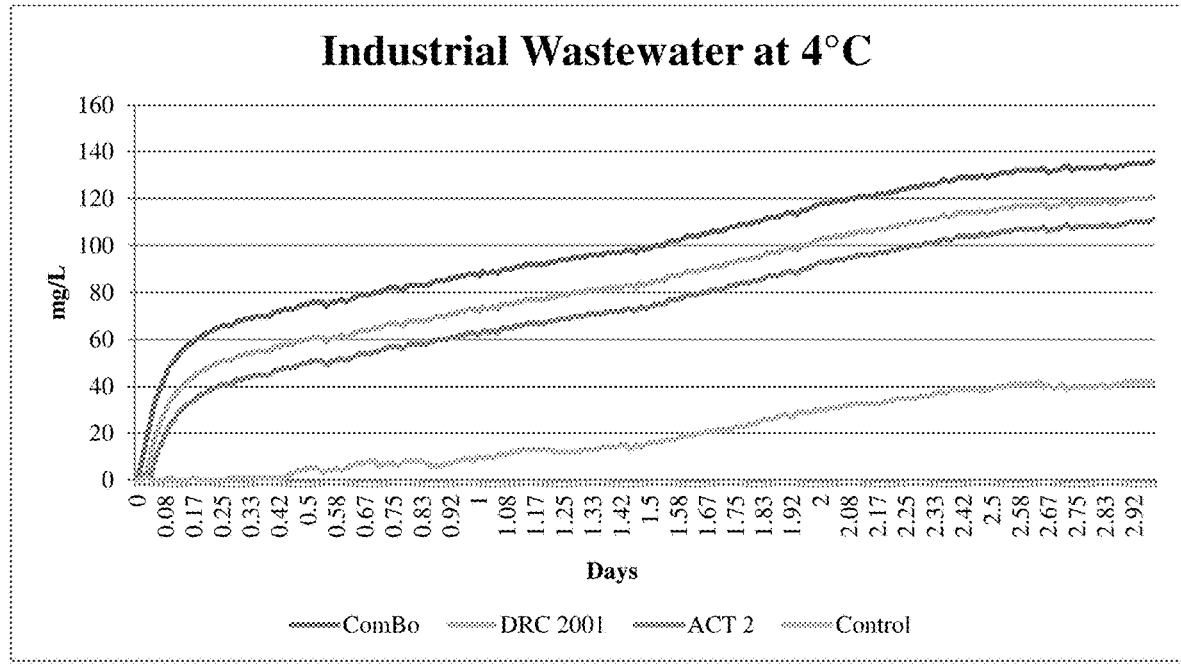
FIG. 1A is a graph showing the biological activities (growth) of ALG and DRT microbial composites independently, a combination of ALG and DRT microbial composites, and a control sample in treated industrial wastewater at 4° C. over time.

For FIGS. 1A-D, the top line is the combination, the bottom line is the control, and ALG is the top line of the intermediate two lines, except for FIG. 1A in which the intermediate lines are the reverse (i.e., DRT is the top line of the two intermediate lines).

DETAILED DESCRIPTION OF ILLUSTRATIVE EMBODIMENTS

Applicants have developed *Bacillus* strains, and combinations thereof, that remain active at low temperatures. The *Bacillus* strains are used in wastewater treatment. More particularly, isolated *Bacillus* strains ALG and DRT, and strains having all of the identifying characteristics of these strains, or combinations thereof, can be used for wastewater treatment.

In one embodiment a method of treating wastewater to remove a pollutant is provided. The method comprises contacting the wastewater with an effective amount of an isolated *Bacillus* strain selected from the group consisting of *Bacillus* strain ALG (NRRL No. B-67134), a strain having all of the identifying characteristics of *Bacillus* strain ALG (NRRL No. B-67134), *Bacillus* strain DRT (NRRL No. B-67135), a strain having all of the identifying characteristics of *Bacillus* strain DRT (NRRL No. B-67135), and combinations thereof, and removing the pollutant.

In another embodiment, a method of controlling a detrimental effect of wastewater is provided. The method comprises contacting the wastewater with an effective amount of an isolated *Bacillus* strain selected from the group consisting of *Bacillus* strain ALG (NRRL No. B-67134), a strain having all of the identifying characteristics of *Bacillus* strain ALG (NRRL No. B-67134), *Bacillus* strain DRT (NRRL No. B-67135), a strain having all of the identifying characteristics of *Bacillus* strain DRT (NRRL No. B-67135), and combinations thereof, and controlling the detrimental effect of the wastewater.

In various other embodiments, a commercial package, an additive for wastewater, and a composition are provided. The commercial package, additive for wastewater, and composition comprise an isolated *Bacillus* strain selected from the group consisting of *Bacillus* strain ALG (NRRL No. B-67134), a strain having all of the identifying characteristics of *Bacillus* strain ALG (NRRL No. B-67134), *Bacillus* strain DRT (NRRL No. B-67135), a strain having all of the identifying characteristics of *Bacillus* strain DRT (NRRL No. B-67135), and combinations thereof.

The following clauses, and combinations thereof, provide various additional illustrative aspects of the invention described herein. The various embodiments described in this section titled "DETAILED DESCRIPTION OF ILLUSTRATIVE EMBODIMENTS" are applicable to any of the following embodiments of the invention described in the numbered clauses below.

1. A method of treating wastewater to remove a pollutant, the method comprising contacting the wastewater with an effective amount of an isolated *Bacillus* strain selected from the group consisting of *Bacillus* strain ALG (NRRL No. B-67134), a strain having all of the identifying characteristics of *Bacillus* strain ALG (NRRL No. B-67134), *Bacillus* strain DRT (NRRL No. B-67135), and a strain having all of the identifying characteristics of *Bacillus* strain DRT (NRRL No. B-67135), and combinations thereof, and removing the pollutant.

2. The method of clause 1 wherein the wastewater is selected from the group consisting of industrial wastewater and sewage wastewater.

3. The method of clause 1 or 2 wherein the wastewater is selected from the group consisting of dairy pond wastewater, grease trap wastewater, sewage wastewater, industrial cooling water wastewater, tannery wastewater, wastewater from the manufacture of a pharmaceutical, wastewater from the manufacture of a pesticide, wastewater from the manufacture of paper, wastewater from the manufacture of oil or gas, plant wastewater, and wastewater from the manufacture of food.

4. The method of any one of clauses 1 to 3 wherein the pollutant is selected from the group consisting of a harmful microorganism, an organic compound, an inorganic compound, and combinations thereof.

5. The method of clause 4 wherein the pollutant is a harmful microorganism and the microorganism is killed.

6. The method of any one of clauses 1 to 5 wherein at least one of the *Bacillus* strains has antimicrobial activity.

7. The method of clause 6 wherein the antimicrobial activity is against bacteria selected from the group consisting of *E. coli, Salmonella, Staphylococcus, Enterococcus, Clostridia, Campylobacter,* and combinations thereof.

8. The method of clause 4 wherein the pollutant is an organic compound.

9. The method of clause 8 wherein the organic compound is removed by degradation.

10. The method of clause 8 wherein the organic compound is selected from the group consisting of a pharmaceutical, a pesticide, a by-product of a tannery process, a by-product of paper manufacture, a by-product of pesticide manufacture, a by-product of oil or gas manufacture, a by-product of food manufacture, and a by-product of human waste.

11. The method of clause 4 wherein the pollutant is an inorganic compound.

12. The method of clause 11 wherein the inorganic compound is nitrogen or sulfur.

13. The method of any one of clauses 1 to 12 wherein the *Bacillus* strain produces an enzyme selected from the group consisting of an a protease, an amylase, a xylanase, a cellulase, and combinations thereof.

14. The method of clause 13 wherein the enzyme is a cellulase and the cellulase is a carboxymethylcellulase.

15. The method of any one of clauses 1 to 14 further comprising treating the wastewater with another bacterial strain selected from the group consisting of another *Bacillus* strain, a lactic acid bacterial strain, and combinations thereof.

16. The method of any one of clauses 1 to 15 wherein the strain is *Bacillus* strain ALG (NRRL No. B-67134), or a strain having all of the identifying characteristics of *Bacillus* strain ALG (NRRL No. B-67134).

17. The method of any one of clauses 1 to 15 wherein the strain is *Bacillus* strain DRT (NRRL No. B-67135), or a strain having all of the identifying characteristics of *Bacillus* strain DRT (NRRL No. B-67135).

18. The method of any one of clauses 1 to 15 wherein the wastewater is treated with a composition comprising *Bacillus* strain ALG (NRRL No. B-67134), or a strain having all of the identifying characteristics of *Bacillus* strain ALG (NRRL No. B-67134), and *Bacillus* strain DRT (NRRL No. B-67135), or a strain having all of the identifying characteristics of *Bacillus* strain DRT (NRRL No. B-67135), in combination in a single composition.

19. The method of any one of clauses 1 to 15 wherein the wastewater is treated with *Bacillus* strain ALG (NRRL No. B-67134), or a strain having all of the identifying characteristics of *Bacillus* strain ALG (NRRL No. B-67134), and *Bacillus* strain DRT (NRRL No. B-67135), or a strain having all of the identifying characteristics of *Bacillus* strain DRT (NRRL No. B-67135), in combination in separate compositions.

20. The method of any one of clauses 1 to 19 wherein the effective amount of the *Bacillus* strain is about $1.0 \times 10^3$ CFU/liter of the wastewater to about $5.0 \times 10^{12}$ CFU/liter of the wastewater.

21. The method of any one of clauses 1 to 19 wherein the effective amount of the *Bacillus* strain is about $1.0 \times 10^3$ CFU/liter of the wastewater to about $1.0 \times 10^{10}$ CFU/liter of the wastewater.

22. The method of any one of clauses 1 to 19 wherein the effective amount is an amount greater than about $1.0 \times 10^3$ CFU/liter of the wastewater.

23. The method of any one of clauses 1 to 22 further comprising contacting the wastewater with an enzyme selected from the group consisting of a galactosidase, a protease, a lipase, an amylase, a hemicellulase, an arabinoxylanase, a xylanase, a cellulase, an NSPase, a phytase, and combinations thereof.

24. A method of controlling a detrimental effect of wastewater, the method comprising contacting the wastewater with an effective amount of an isolated *Bacillus* strain selected from the group consisting of *Bacillus* strain ALG (NRRL No. B-67134), a strain having all of the identifying characteristics of *Bacillus* strain ALG (NRRL No. B-67134), *Bacillus* strain DRT (NRRL No. B-67135), a strain having all of the identifying characteristics of *Bacillus* strain DRT (NRRL No. B-67135), and combinations thereof, and controlling the detrimental effect of the wastewater.

25. The method of clause 24 wherein the wastewater is selected from the group consisting of industrial wastewater and sewage wastewater.

26. The method of clause 24 or 25 wherein the wastewater is selected from the group consisting of dairy pond wastewater, grease trap wastewater, sewage wastewater, industrial cooling water wastewater, tannery wastewater, wastewater from the manufacture of a pharmaceutical, wastewater from the manufacture of a pesticide, wastewater from the manufacture of paper, wastewater from the manufacture of oil or gas, plant wastewater, and wastewater from the manufacture of food.

27. The method of any one of clauses 24 to 26 wherein the detrimental effect of the wastewater is caused by a pollutant selected from the group consisting of a harmful microorganism, an organic compound, an inorganic compound, and combinations thereof.

28. The method of clause 27 wherein the pollutant is a harmful microorganism and the microorganism is killed.

29. The method of any one of clauses 24 to 28 wherein at least one of the *Bacillus* strains has antimicrobial activity.

30. The method of clause 29 wherein the antimicrobial activity is against bacteria selected from the group consisting of *E. coli, Salmonella, Staphylococcus, Enterococcus, Clostridia, Campylobacter,* and combinations thereof.

31. The method of clause 27 wherein the pollutant is an organic compound.

32. The method of clause 31 wherein the organic compound is removed by degradation.

33. The method of clause 31 wherein the organic compound is selected from the group consisting of a pharmaceutical, a pesticide, a by-product of a tannery process, a by-product of paper manufacture, a by-product of pesticide manufacture, a by-product of oil or gas manufacture, a by-product of food manufacture, and a by-product of human waste.

34. The method of clause 27 wherein the pollutant is an inorganic compound.

35. The method of clause 35 wherein the inorganic compound is nitrogen or sulfur.

36. The method of any one of clauses 24 to 35 wherein the *Bacillus* strain produces an enzyme selected from the group consisting of an a protease, an amylase, a xylanase, a cellulase, and combinations thereof.

37. The method of clause 36 wherein the enzyme is a cellulase and the cellulase is a carboxymethylcellulase.

38. The method of any one of clauses 24 to 37 further comprising contacting the wastewater with another bacterial strain selected from the group consisting of another *Bacillus* strain, a lactic acid bacterial strain, and combinations thereof.

39. The method of any one of clauses 24 to 38 wherein the strain is *Bacillus* strain ALG (NRRL No. B-67134), or a strain having all of the identifying characteristics of *Bacillus* strain ALG (NRRL No. B-67134).

40. The method of any one of clauses 24 to 38 wherein the strain is *Bacillus* strain DRT (NRRL No. B-67135), or a strain having all of the identifying characteristics of *Bacillus* strain DRT (NRRL No. B-67135).

41. The method of any one of clauses 24 to 38 wherein the wastewater is contacted with a composition comprising *Bacillus* strain ALG (NRRL No. B-67134), or a strain having all of the identifying characteristics of *Bacillus* strain ALG (NRRL No. B-67134), and *Bacillus* strain DRT (NRRL No. B-67135), or a strain having all of the identifying characteristics of *Bacillus* strain DRT (NRRL No. B-67135), in combination in a single composition.

42. The method of any one of clauses 24 to 38 wherein the wastewater is contacted with *Bacillus* strain ALG (NRRL No. B-67134), or a strain having all of the identifying characteristics of *Bacillus* strain ALG (NRRL No. B-67134), and *Bacillus* strain DRT (NRRL No. B-67135), or a strain having all of the identifying characteristics of *Bacillus* strain DRT (NRRL No. B-67135), in combination in separate compositions.

43. The method of any one of clauses 24 to 42 wherein the effective amount of the *Bacillus* strain is about $1.0 \times 10^3$ CFU/liter of the wastewater to about $5.0 \times 10^{12}$ CFU/liter of the wastewater.

44. The method of any one of clauses 24 to 42 wherein the effective amount of the *Bacillus* strain is about $1.0 \times 10^3$ CFU/liter of the wastewater to about $1.0 \times 10^{10}$ CFU/liter of the wastewater.

45. The method of any one of clauses 24 to 42 wherein the effective amount is an amount greater than about $1.0 \times 10^3$ CFU/liter of the wastewater.

46. The method of any one of clauses 24 to 45 further comprising contacting the wastewater with an enzyme selected from the group consisting of a galactosidase, a protease, a lipase, an amylase, a hemicellulase, an arabinoxylanase, a xylanase, a cellulase, an NSPase, a phytase, and combinations thereof.

47. A commercial package comprising an isolated *Bacillus* strain selected from the group consisting of *Bacillus* strain ALG (NRRL No. B-67134), a strain having all of the identifying characteristics of *Bacillus* strain ALG (NRRL No. B-67134), *Bacillus* strain DRT (NRRL No. B-67135), a strain having all of the identifying characteristics of *Bacillus* strain DRT (NRRL No. B-67135), and combinations thereof.

48. An additive for wastewater comprising an isolated *Bacillus* strain selected from the group consisting of *Bacillus* strain ALG (NRRL No. B-67134), a strain having all of the identifying characteristics of *Bacillus* strain ALG (NRRL No. B-67134), *Bacillus* strain DRT (NRRL No. B-67135), a strain having all of the identifying characteristics of *Bacillus* strain DRT (NRRL No. B-67135), and combinations thereof.

49. A composition comprising an isolated *Bacillus* strain selected from the group consisting of *Bacillus* strain ALG (NRRL No. B-67134), a strain having all of the identifying characteristics of *Bacillus* strain ALG (NRRL No. B-67134), *Bacillus* strain DRT (NRRL No. B-67135), a strain having all of the identifying characteristics of *Bacillus* strain DRT (NRRL No. B-67135), and combinations thereof.

50. The commercial package, additive, or composition of any one of clauses 47 to 49 wherein the *Bacillus* strain causes degradation of an organic compound or removal of an inorganic compound in wastewater.

51. The commercial package, additive, or composition of any one of clauses 47 to 50 wherein the *Bacillus* strain inhibits a pathogen selected from the group consisting of *E. coli, Salmonella, Staphylococcus, Enterococcus, Campylobacter,* and *Clostridium*.

52. The commercial package, additive, or composition of any one of clauses 47 to 51 wherein the *Bacillus* strain is in the form of a concentrate.

53. The commercial package, additive, or composition of any one of clauses 47 to 51 wherein the *Bacillus* strain is in the form of a superconcentrate.

54. The commercial package, additive, or composition of any one of clauses 47 to 53 wherein the *Bacillus* strain is in dry form.

55. The commercial package, additive, or composition of any one of clauses 47 to 54 wherein the *Bacillus* strain is in pelleted form.

56. The commercial package, additive, or composition of any one of clauses 47 to 55 wherein the *Bacillus* strain is in a form for use in treatment of wastewater selected from the group consisting of dairy pond wastewater, grease trap wastewater, sewage wastewater, industrial cooling water wastewater, tannery wastewater, wastewater from the manufacture of a pharmaceutical, wastewater from the manufacture of a pesticide, wastewater from the manufacture of paper, wastewater from the manufacture of oil or gas, plant wastewater, and wastewater from the manufacture of food.

57. The commercial package, additive, or composition of any one of clauses 47 to 56 wherein the strain is in a form selected from the group consisting of a powder, a liquid, and a pellet form.

58. The commercial package, additive, or composition of any one of clauses 47 to 57 further comprising a carrier for the *Bacillus* strain.

59. The commercial package, additive, or composition of clause 58 wherein the carrier is selected from the group consisting of salt, a dextrin, and combinations thereof.

60. The commercial package, additive, or composition of any one of clauses 47 to 59 in a bag.

61. The commercial package, additive, or composition of clause 60 wherein the bag is a plastic bag.

62. The commercial package, additive, or composition of any one of clauses 47 to 61 further comprising instructions for use of one or more of the *Bacillus* strains.

63. The commercial package, additive, or composition of any one of clauses 47 to 62 in a 20-pound bag.

64. The commercial package, additive, or composition of any one of clauses 47 to 62 in a 50-pound bag.

65. The commercial package, additive, or composition of any one of clauses 47 to 54 or 56 to 64 wherein the *Bacillus* strain is in powder form.

66. The commercial package, additive, or composition of any one of clauses 47 to 53 or 56 to 62 wherein the *Bacillus* strain is in liquid form.

67. The commercial package, additive, or composition of any one of clauses 47 to 66 wherein the *Bacillus* strain is in a container for commercial use.

68. The commercial package, additive, or composition of clause 67 wherein the container comprises plastic.

69. The commercial package, additive, or composition of clause 67 wherein the container comprises paper.

70. The commercial package, additive, or composition of any one of clauses 47 to 69 further comprising a binder.

71. The commercial package, additive, or composition of clause 70 wherein the binder is selected from the group consisting of clay, yeast cell wall components, aluminum silicate, and glucan, or combinations thereof.

72. The method, commercial package, additive, or composition of any one of clauses 1 to 71 wherein the *Bacillus* strain retains activity at a temperature as low as 4° C.

In various embodiments, the *Bacillus* strain (e.g., *Bacillus* strain ALG and/or DRT) for use in accordance with the methods, commercial packages, additives for wastewater, and compositions described herein can be selected from the group consisting of *Bacillus* strain ALG, a strain having all of the identifying characteristics of *Bacillus* strain ALG, *Bacillus* strain DRT, and a strain having all of the identifying characteristics of *Bacillus* strain DRT. *Bacillus* strain MDG ATC 2 and *Bacillus* strain MDG DRC 2001 were deposited on Sep. 16, 2015 at the Agricultural Research Service Culture Collection (NRRL), International Depository Authority, 1815 North University Street, Peoria, Illinois 61604-3999, and were given accession numbers NRRL B-67134 and NRRL B-67135, respectively. The deposits were made under the provisions of the Budapest Treaty on the International Recognition of the Deposit of Microorganisms for the Purposes of Patent Procedure. The NRRL strain designations are MDG ATC 2 and MDG DRC 2001, which are equivalent to *Bacillus* strain ALG and DRT, respectively, as referred to in the application.

Any of these strains can be used to treat wastewater alone or in combination in the form of an additive for wastewater or a composition as described herein (e.g., an additive or a composition further comprising a carrier and/or a binder). In one embodiment, multiple strains are used to treat wastewater in combination in a single composition. In another embodiment, multiple strains are used to treat wastewater in combination in separate compositions.

As used herein "a strain having all of the identifying characteristics of" *Bacillus* strain ALG or *Bacillus* strain DRT can be a mutant strain having all of the identifying characteristics of *Bacillus* strain ALG or *Bacillus* strain DRT (e.g., a DNA fingerprint based on DNA analysis that corresponds to the DNA fingerprint of *Bacillus* strain ALG or *Bacillus* strain DRT, enzyme activities that correspond to *Bacillus* strain ALG or *Bacillus* strain DRT, antimicrobial activity that corresponds to *Bacillus* strain ALG or *Bacillus* strain DRT, antibiotic sensitivity and tolerance profiles that correspond to *Bacillus* strain ALG or *Bacillus* strain DRG, or combinations thereof). In alternate embodiments, the mutation can be a natural mutation, or a genetically engineered mutation. In another embodiment, "a strain having all of the identifying characteristics of" *Bacillus* strain ALG or *Bacillus* strain DRT can be a strain, for example, produced by isolating one or more plasmids from *Bacillus* strain ALG or *Bacillus* strain DRT and introducing the one or more plasmids into another bacterium, such as another *Bacillus* strain, as long as the one or more plasmids contain DNA that provides the identifying characteristics of *Bacillus* strain ALG or *Bacillus* strain DRT (e.g., a DNA fingerprint based on DNA analysis that corresponds to the DNA fingerprint of *Bacillus* strain ALG or *Bacillus* strain DRT).

In one aspect, the microbial strains described herein can show high biological activities (e.g., about 65% to about 100% activity, about 70% to about 100% activity, about 75% to about 100% activity, or about 80% to about 100% activity) even in low temperature environments. In the method, commercial package, additive, or composition embodiments described herein, the *Bacillus* strain (e.g., ALG and/or DRT) can retain activity (e.g., growth, antibacterial activity, ability to produce enzymes, etc.) at a temperature as low as −30° C., −20° C., −10° C., −5° C., −3° C., −1° C., 0° C., 1° C., 4° C., 8° C., 10° C., 12° C., 15° C., 20° C., or 30° C.

In another embodiment, one or more of the *Bacillus* strains described in the preceding paragraphs (e.g., *Bacillus* strain ALG and/or *Bacillus* strain DRT) can be used to treat wastewater along with another bacterial strain selected from the group consisting of another *Bacillus* strain, a lactic acid bacterial strain, and combinations thereof. In yet another embodiment, one or more of the *Bacillus* strains described in the preceding paragraphs (e.g., *Bacillus* strain ALG and/or *Bacillus* strain DRT) can be used to treat wastewater along with any other bacterial strain effective to treat wastewater to remove pollutants or to control detrimental effects of wastewater.

The additive for wastewater or the composition described herein can be used to treat wastewater for any period of time that is effective to remove pollutants and/or control the detrimental effects of wastewater. For example, in one embodiment treatment of wastewater can occur daily. The time periods for treatment of wastewater are non-limiting and it should be appreciated that any time period or treatment schedule determined to be effective to remove pollutants and/or control the detrimental effects of wastewater may be used.

In various illustrative embodiments, the *Bacillus* strain (e.g., *Bacillus* strain ALG and/or DRT), or any other bacterial strains added in addition to *Bacillus* strain ALG and/or DRT, can be added to the wastewater at about $1.0\times10^3$ CFU/liter of the wastewater to about $5.0\times10^{12}$ CFU/liter of the wastewater or at about $1.0\times10^3$ CFU/liter of the wastewater to about $1.0\times10^{10}$ CFU/liter of the wastewater. In other embodiments, the *Bacillus* strain (e.g., *Bacillus* strain ALG and/or DRT) can be added to the wastewater at an amount greater than about $1.0\times10^3$ CFU/liter of the wastewater, at greater than about $1.1\times10^3$ CFU/liter of the wastewater, at greater than about $1.25\times10^3$ CFU/ liter of the wastewater, at greater than about $1.5\times10^3$ CFU/ liter of the wastewater, at greater than about $1.75\times10^3$ CFU/liter of the wastewater, at greater than about $1.0\times10^4$ CFU/liter of the wastewater, at greater than about $2.0\times10^4$ CFU/liter of the wastewater, at greater than about $3.0\times10^4$ CFU/liter of the wastewater, at greater than about $4.0\times10^4$ CFU/liter of the wastewater, at greater than about $5.0\times10^4$ CFU/liter of the wastewater, at greater than about $6.0\times10^4$ CFU/liter of the wastewater, at greater than about $7.0\times10^4$ CFU/liter of the wastewater, at greater than about $8.0\times10^4$ CFU/liter of the wastewater, at greater than about $1.0\times10^5$ CFU/liter of the wastewater, at greater than about $1.0\times10^6$ CFU/liter of the wastewater, at greater than about $1.0\times10^7$ CFU/liter of the wastewater, at greater than about $1.0\times10^8$ CFU/liter of the wastewater, at greater than about $1.0\times10^9$ CFU/liter of the wastewater, at greater than about $1.0\times10^{10}$ CFU/liter of the wastewater, at greater than about $1.0\times10^{11}$ CFU/liter of the wastewater, or at greater than about $1.0\times10^{12}$ CFU/liter of the wastewater.

In various embodiments, the wastewater described herein can be selected from the group consisting of industrial wastewater and sewage wastewater. In these embodiments, the wastewater can be selected from the group consisting of dairy pond wastewater, grease trap wastewater, sewage wastewater, industrial cooling water wastewater, tannery wastewater, wastewater from the manufacture of a pharmaceutical, wastewater from the manufacture of a pesticide, wastewater from the manufacture of paper, wastewater from the manufacture of oil or gas, and wastewater from the manufacture of food, or any other type of wastewater comprising pollutants that need to be removed or having a detrimental effect that needs to be controlled.

As used herein "remove a pollutant" or "removal of a pollutant" means completely removing the pollutant, reducing the amount of the pollutant, inactivating the pollutant, degrading the pollutant, or causing the pollutant to be converted to an inactivated form. In the case of a harmful microorganism "remove a pollutant" or "removal of a pollutant" can also mean killing the microorganism, reducing the number of the harmful microorganisms in the wastewater, and/or inhibiting the activity of the microorganism.

In various illustrative aspects, the pollutants that can be removed from the wastewater can be selected from the group consisting of a harmful microorganism, an organic compound, an inorganic compound, and combinations thereof. In some embodiments described herein, at least one of the *Bacillus* strains can have antimicrobial activity. Such antimicrobial activity can be against, for example, *E. coli, Salmonella, Staphylococcus, Enterococcus, Clostridia, Campylobacter,* and combinations thereof.

In the embodiment where the pollutant is an organic compound, the organic compound can be removed by degradation. In this embodiment, the organic compound can be selected from the group consisting of a pharmaceutical, a pesticide, a by-product of a tannery process, a by-product of paper manufacture, a by-product of pesticide manufacture, a by-product of oil or gas manufacture, a by-product of food manufacture, and a by-product of human waste, or any other organic compound that is a pollutant in wastewater or is the cause of a detrimental effect of wastewater. In the embodiment where the pollutant is an inorganic compound, the inorganic compound can be, for example, nitrogen or sulfur.

In various illustrative aspects, the *Bacillus* strains described herein (i.e., *Bacillus* strains ALG and/or DRT)

produce an enzyme selected from the group consisting of a protease, an amylase, a xylanase, a cellulase, and combinations thereof. In the embodiment wherein the enzyme is a cellulase, the cellulase can be a carboxymethylcellulase.

In one illustrative embodiment, one or more enzymes may be added to the additive for wastewater or the composition described herein or may be added directly to the wastewater in combination with the *Bacillus* strains described herein. In various embodiments, the enzymes that may be used to treat the wastewater in addition to the *Bacillus* strains include a galactosidase, a phytase, a protease, a lipase, an amylase, a hemicellulase, an arabinoxylanase, a xylanase, a cellulase, an NSPase, combinations thereof, and any other enzyme that is suitable to treat wastewater to remove pollutants or control a detrimental effect of wastewater. Any of the enzymes described above that are suitable for treatment of wastewater may be added as a component of the commercial package, additive for wastewater, or composition described herein, or may be added directly the wastewater as a separate composition.

In additional embodiments of the invention, compositions comprising *Bacillus* strain ALG and/or *Bacillus* strain DRT are provided. In one embodiment, a commercial package is provided comprising an isolated *Bacillus* strain selected from the group consisting of *Bacillus* strain ALG (NRRL No. B-67134), *Bacillus* strain DRT (NRRL No. B-67135), a strain having all of the identifying characteristics of *Bacillus* strain ALG (NRRL No. B-67134), a strain having all of the identifying characteristics of *Bacillus* strain DRT (NRRL No. B-67135), and combinations thereof.

In another embodiment, an additive for wastewater is provided comprising an isolated *Bacillus* strain selected from the group consisting of *Bacillus* strain ALG (NRRL No. B-67134), *Bacillus* strain DRT (NRRL No. B-67135), a strain having all of the identifying characteristics of *Bacillus* strain ALG (NRRL No. B-67134), a strain having all of the identifying characteristics of *Bacillus* strain DRT (NRRL No. B-67135), and combinations thereof.

In yet another embodiment, a composition is provided comprising an isolated *Bacillus* strain selected from the group consisting of *Bacillus* strain ALG (NRRL No. B-67134), *Bacillus* strain DRT (NRRL No. B-67135), a strain having all of the identifying characteristics of *Bacillus* strain ALG (NRRL No. B-67134), a strain having all of the identifying characteristics of *Bacillus* strain DRT (NRRL No. B-67135), and combinations thereof.

In these embodiments the *Bacillus* strain can be in the form of, for example, a powder, a liquid, or pellets, and can be mixed with the wastewater using any suitable method known in the art to achieve any of the amounts of *Bacillus* strain ALG and *Bacillus* strain DRT described herein, for the treatment of wastewater to remove pollutants or to control a detrimental effect of wastewater.

In any of the composition embodiments described herein, the *Bacillus* strain ALG and/or *Bacillus* strain DRT can inhibit a pathogen selected from the group consisting of *E. coli, Salmonella, Staphylococcus, Enterococcus, Clostridia, Campylobacter,* and combinations thereof. These types of microorganisms are non-limiting examples of the types of microorganisms *Bacillus* strain ALG and/or *Bacillus* strain DRT can inhibit. In these embodiments, the *Bacillus* strain (e.g., ALG and/or DRT) can cause degradation of an organic compound or removal of an inorganic compound in wastewater.

In illustrative aspects, the *Bacillus* strain ALG and/or *Bacillus* strain DRT can be in the form of a commercial package, an additive for wastewater or any suitable composition. In another illustrative embodiment, the *Bacillus* strain ALG and/or *Bacillus* strain DRT in the commercial package, additive for wastewater, or composition can be in the form of a concentrate (e.g., about $1 \times 10^8$ to about $5 \times 10^9$ CFU/g) or a superconcentrate (e.g., about $1 \times 10^{10}$ to about $5 \times 10^{12}$ CFU/g). In another embodiment, the *Bacillus* strain ALG and/or *Bacillus* strain DRT in the commercial package, additive for wastewater, or composition can be in a dry form (e.g., a powder), a pelleted form, a liquid form, a freeze-dried form, or in the form of a gel, or any other suitable form.

In another illustrative embodiment, the *Bacillus* strain in the commercial package, additive for wastewater, or composition can further comprise a carrier for the *Bacillus* strain ALG and/or *Bacillus* strain DRT. The carrier can be selected from the group consisting of a salt, mineral oil, a dextrin (e.g., maltodextrin), whey, sugar, limestone, dried starch, sodium silico aluminate, and combinations thereof. In another embodiment, the carrier can be any suitable carrier known in the art for a composition for treating wastewater. In another embodiment, the *Bacillus* strain in the commercial package, additive for wastewater, or composition can further comprise a binder such as clay, yeast cell wall components, aluminum silicate, glucan, or other known binders, and/or micronutrients.

In yet other embodiments, the commercial package, additive for wastewater, or composition comprising *Bacillus* strain ALG and/or *Bacillus* strain DRT is in a container for commercial use. In various embodiments the container can be, for example, a bag (e.g., a 20-pound bag, a 50-pound bag, a 2-ounce bag, a 1-pound bag, or a 1-kilogram bag), a pouch, a drum, a bottle, or a box. In illustrative aspects, the container comprising *Bacillus* strain ALG and/or *Bacillus* strain DRT can comprise plastic, metal, foil, paper, fiber, or cardboard (e.g., a plastic pail, a paper bag, a foil bag, a fiber drum, etc.). The commercial package can further comprise instructions for use of one or more of the *Bacillus* strains.

The following examples are for illustrative purposes only. The examples are non-limiting, and are not intended to limit the invention in any way.

EXAMPLE 1

Biological Growth Activity of Microbial Strains at Different Temperatures

The objective of the instant example was to compare the growth ability of microbial strains of the present disclosure at different temperature ranges. Two different microbial strains of the present disclosure (i.e., ALG (ACT 2) and DRT (DRC 2001)) were tested for their growth at different temperatures when grown in tryptic soy broth. Samples of each microbial strain were taken after 72 hours of incubation at 4° C., 15° C., 20° C., and 32° C. The microbial samples were then tested for biological growth activity as assessed by optical density using a spectrometer.

As shown in Table 1, both of the microbial strains of the present disclosure showed biological growth activities at the different temperatures tested. For example, the ACT 2 (ALG) microbial strain showed a similar O.D. of 1.001 and 1.000 at the low temperature, 4° C., and the high temperature, 32° C., respectively. However, the growth activity of the ACT 2 (ALG) strain was similar at 15° C. and 20° C. with O.D.s of 1.456 and 1.463, respectively.

Similarly, the DRC 2001 (DRT) microbial strain showed a similar O.D. of 1.060 and 1.012 at the low temperature, 4° C., and the high temperature, 32° C., respectively (see Table 1). However, the growth activity of the DRC 2001 (DRT) microbial strain at 15° C. and 20° C. had an O.D. of 1.477 and 1.488, respectively.

TABLE 1

| Temperature | 4° C. | 15° C. | 20° C. | 32° C. |
|---|---|---|---|---|
| ACT 2 (O.D.) | 1.001 | 1.456 | 1.463 | 1.000 |
| DRC 2001 (O.D.) | 1.060 | 1.477 | 1.488 | 1.012 |

EXAMPLE 2

Biological Activity of Microbial Strains in Different Wastewater Types and at Different Temperatures The objective of the instant example was to compare the biological activities of the microbial strains of the present disclosure using different wastewater samples at different temperatures. For example, industrial wastewater at 4° C. (see FIG. 1A) and 20° C. (see FIG. 1A) was treated with ACT 2 (ALG) and DRC 2001 (DRT) microbial strains independently, or with a combination of ACT 2 (ALG) and DRC 2001 (DRT) microbial strains, and a control sample.

Figure 1B:
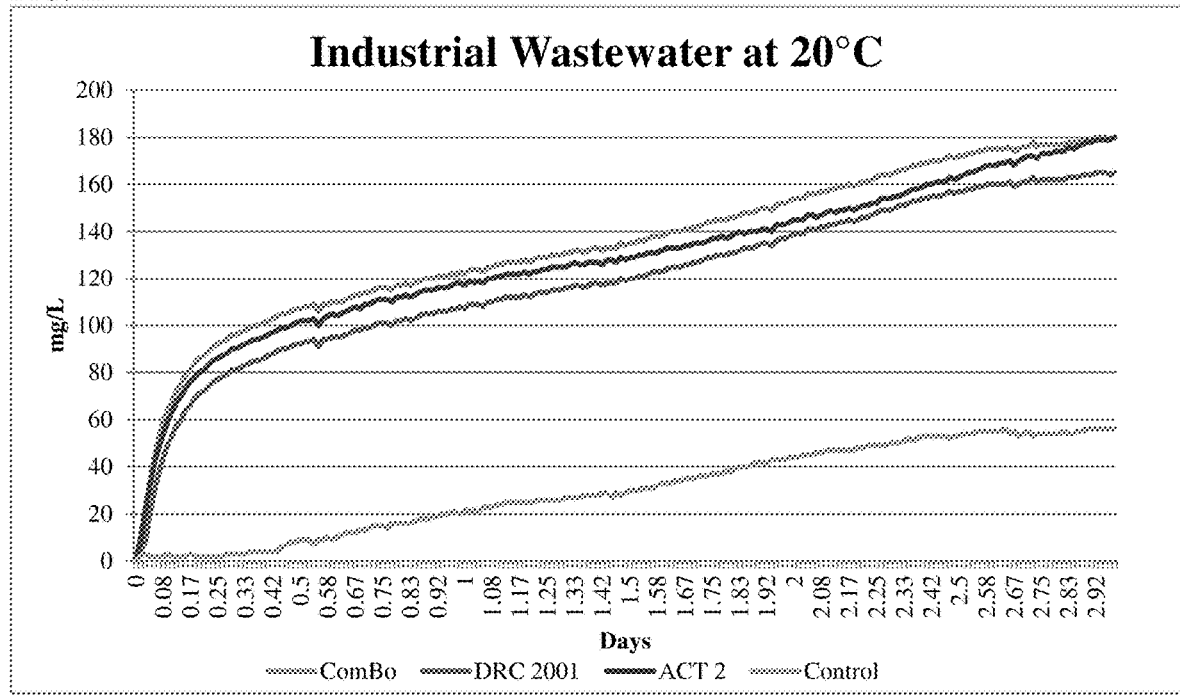
FIG. 1B is a graph showing the biological activities (growth) of ALG and DRT microbial composites independently, a combination of ALG and DRT microbial composites, and a control sample in treated industrial wastewater at 20° C. over time.

As shown in FIGS. 1A and 1B, the combination of the ACT 2 (ALG) and DRC 2001 (DRT) microbial strains had greater biological activity than either the ACT 2 or the DRC 2001 microbial strains independently in industrial wastewater at 4° C. and 20° C. However, both the ACT 2 and DRC 2001 microbial strains independently had greater biological activity than the control microbe in industrial wastewater at 4° C. and 20° C. (see FIGS. 1A and 1B).

Figure 1C:
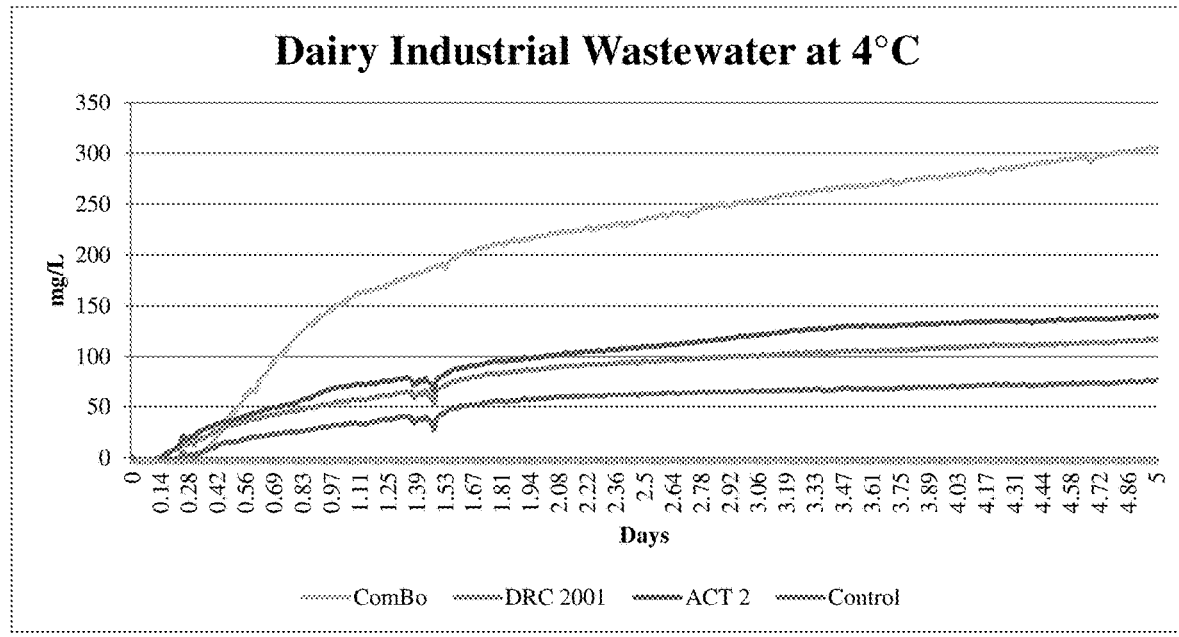
FIG. 1C is a graph showing the biological activities (growth) of ALG and DRT microbial composites independently, a combination of ALG and DRT microbial composites, and a control sample in treated dairy pond industrial wastewater at 4° C. over time.
Figure 1D:
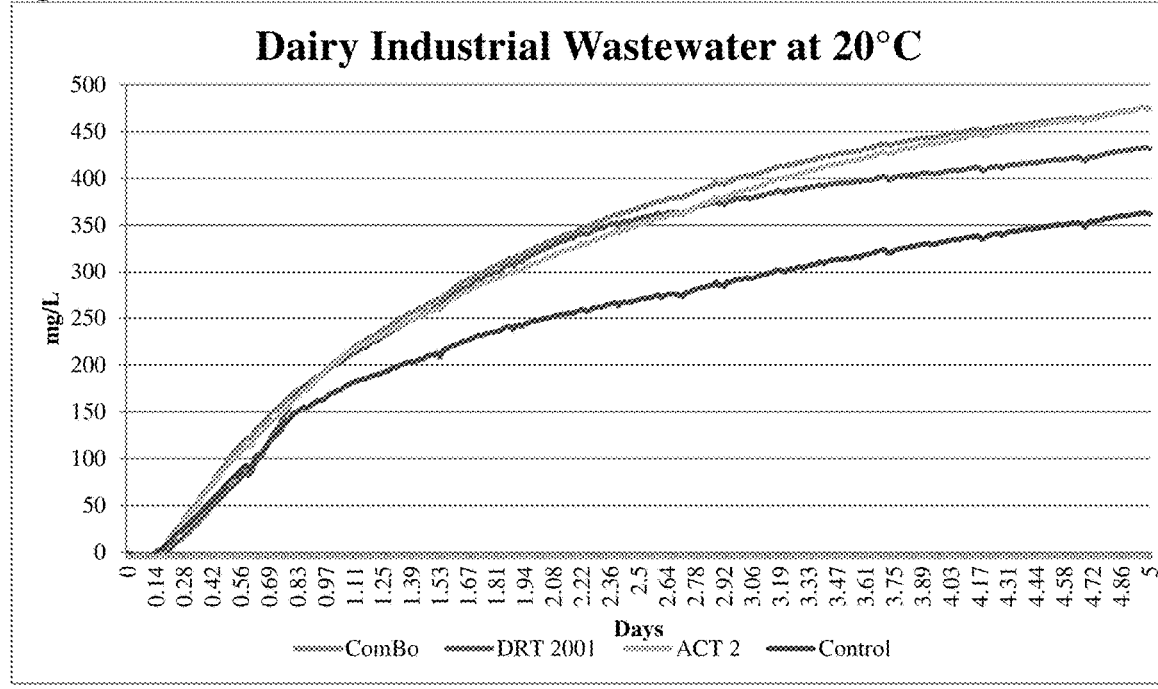
FIG. 1D is a graph showing the biological activities (growth) of ALG and DRT microbial composites independently, a combination of ALG and DRT microbial composites, and a control sample in treated dairy pond industrial wastewater at 4° C. over time.

Similar results are shown for dairy pond industrial wastewater in FIGS. 1C and 1D. Each sample was adjusted to optimal conditions following the ratio of $BOD:NH_4:PO_4$ of 100:5:1 and each sample was run at 4° C. and 20° C. using a BODtrak Respirometric BOD apparatus from Hach.

EXAMPLE 3

Enzyme Activity of Microbial Strain Composites at Different Temperatures

The objective of the instant example was to ascertain the enzyme activities of the microbial composites of the present disclosure at different temperatures. Enzyme assay media plates were prepared by supplementing tryptic soy agar with between 0.5% and 1% of various substrates, including polysaccharides (e.g., corn starch, carboxymethylcellulose, or xylan) or proteins (e.g., casein). Five microliters (5 µL) of Bacillus microbial strains of the present disclosure, ALG and DRT, were obtained from fresh overnight cultures, and were spotted onto agar plates. The inoculated agar plates were incubated at various temperatures, such as 4° C., 15° C., 20° C., and 32° C. for a time period ranging from about 4 to about 48 hours. Zones of clearing around enzyme-producing colonies were visible on protein agar plates without further treatment. Polysaccharide-containing agar plates were stained with Gram's iodine for 1 minute to visualize zones of clearing.

As shown in Table 2, both ALG and DRT microbial strains were observed to be positive for protease, amylase, carboxymethylcellulose (i.e., CMCase), and xylanase activity after 48 hours at 4° C. ALG and DRT microbial strains were also observed to have positive enzyme activity for three tested enzymes (zylanase, protease, and CMCase) after 48 hours at 15° C., 25° C., and 32° C. (see Table 2). In contrast, neither ALG nor DRT microbial strains were observed to have positive amylase activity after 48 hours at 15° C., 25° C., and 32° C. (see Table 2).

TABLE 2

| Temperature | Strain | Xylanase | CMCase | Amylase | Protease |
|---|---|---|---|---|---|
| 4° C. | ALG | + | + | + | + |
|  | DRT | + | + | + | + |
| 15° C. | ALG | + | + | − | + |
|  | DRT | + | + | − | + |
| 25° C. | ALG | + | + | − | + |
|  | DRT | + | + | − | + |
| 32° C. | ALG | + | + | − | + |
|  | DRT | + | + | − | + |

EXAMPLE 4

Genomic Analysis of Microbial Strains ALG and DRT

In order to obtain genomic "fingerprints" of Bacillus strains ALG and DRT collected in the strain library, Next Generation Sequencing analysis was performed according to the manufacturer's instructions with each Bacillus strain. The raw sequencing data was assembled de novo into contigs and consensus sequences. Gene prediction using the microbial genome was then followed by functional annotation of novel sequences.

Figure 2:
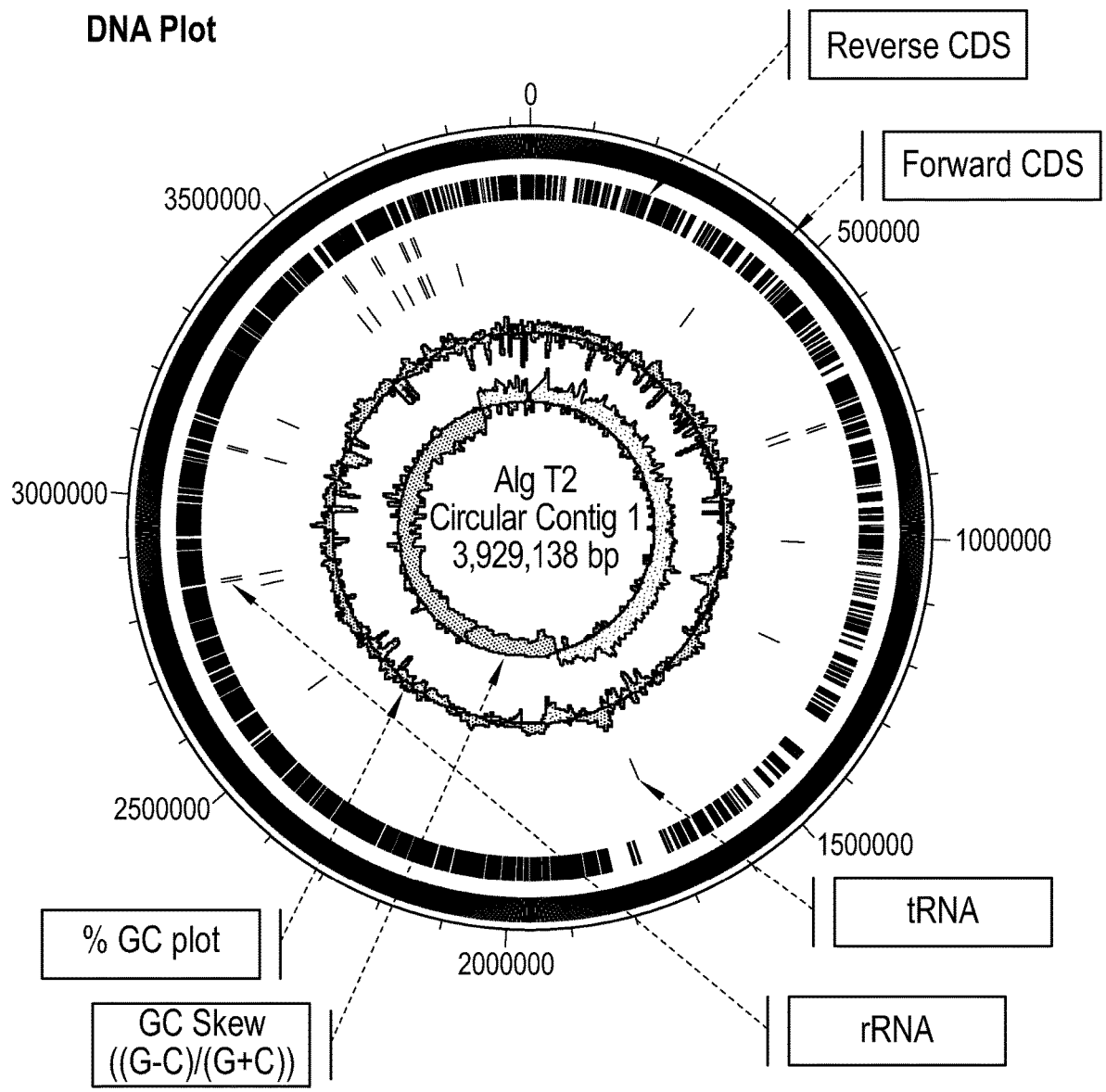
FIG. 2 is a genomic map showing genomic annotation of microbial strain ALG.
Figure 3:
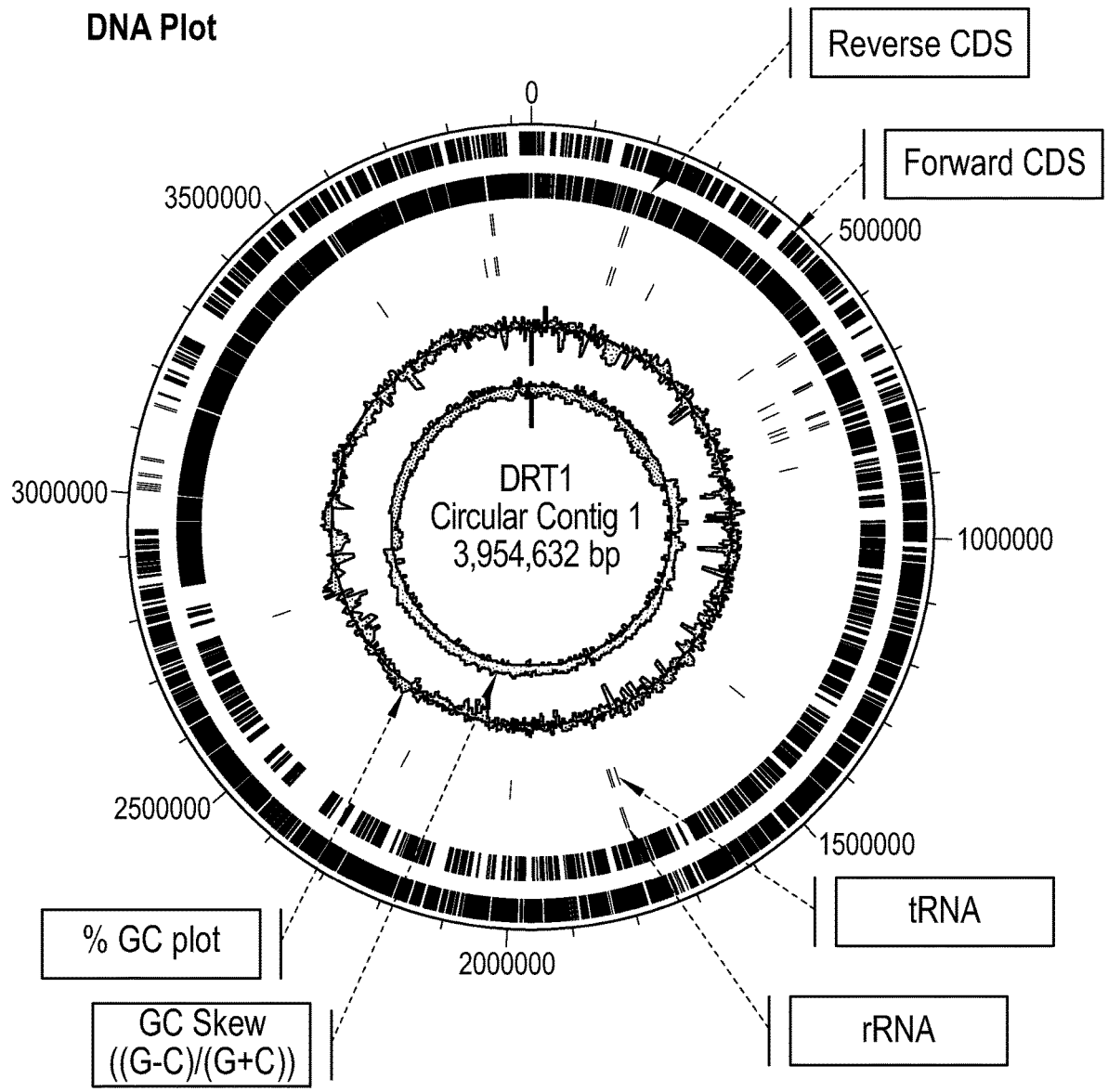
FIG. 3 is a genomic map showing genomic annotation of microbial strain DRT.

FIGS. 2 and 3 show genomic annotation of microbial strains ALG and DRT, respectively. As shown in FIG. 2, microbial strain ALG comprises approximately 3,929,138 bp (i.e., about 3929 kb) of genomic sequence. Microbial strain DRT was slightly smaller comprising about 3,654,632 bp (i.e., about 3654 kb) of genomic sequence. Therefore, FIGS. 2 and 3 demonstrate that microbial strains ALG and DRT are different strains, each having a unique DNA fingerprint. In addition, sequencing of Microbial strains ALG and DRT identified many different genes within the strains.

What is claimed is:

1. A method of treating wastewater by contacting the wastewater with a Bacillus strain to remove a microorganism, the method comprising contacting the wastewater with an isolated Bacillus strain selected from the group consisting of Bacillus strain ALG (NRRL No. B-67134), Bacillus strain DRT (NRRL No. B-67135), and combinations thereof, and removing the microorganism wherein the microorganism is removed by killing the microorganism and wherein at least one of the Bacillus strains has antimicrobial activity against bacteria selected from the group consisting of E. coli, Salmonella, Staphylococcus, Enterococcus, Clostridia, Campylobacter, and combinations thereof, wherein the Bacillus strains maintain growth activity at a temperature of 4° C. relative to the growth activity of the strains at 32° C.

2. The method of claim 1 wherein the wastewater is selected from the group consisting of industrial wastewater and sewage wastewater.

3. The method of claim 1 wherein the wastewater is selected from the group consisting of dairy pond wastewater, grease trap wastewater, sewage wastewater, industrial cooling water wastewater, tannery wastewater, wastewater from manufacturing a pharmaceutical, wastewater from manufacturing a pesticide, wastewater from manufacturing paper, wastewater from manufacturing oil or gas, plant wastewater, and wastewater from manufacturing food.

4. The method of claim 1 wherein the *Bacillus* strain selected from the group consisting of *Bacillus* strain ALG (NRRL No. B-67134), *Bacillus* strain DRT (NRRL No. B-67135), and combinations thereof, produces an enzyme selected from the group consisting of a protease, an amylase, a xylanase, a cellulase, and combinations thereof.

5. The method of claim 4 wherein the enzyme is a cellulase and the cellulase is a carboxymethylcellulase.

6. The method of claim 1 wherein the wastewater is further treated with a *Bacillus* strain different from *Bacillus* strain ALG (NRRL No. B-67134) or different from *Bacillus* strain DRT (NRRL No. B-67135), or a lactic acid bacterial strain, and combinations of the different strains and the lactic acid bacterial strain that are used for further treatment.

7. The method of claim 1 wherein *Bacillus* strain ALG (NRRL No. B-67134) is selected as a sole *Bacillus* strain placed in contact with said wastewater.

8. The method of claim 1 wherein *Bacillus* strain DRT (NRRL No. B-67135) is selected as a sole *Bacillus* strain placed in contact with said wastewater.

9. The method of claim 1 wherein the wastewater is treated with a composition comprising *Bacillus* strain ALG (NRRL No. B-67134) and *Bacillus* strain DRT (NRRL No. B-67135) in combination in a single treatment.

10. The method of claim 1 wherein the wastewater is treated with *Bacillus* strain ALG (NRRL No. B-67134) and *Bacillus* strain DRT (NRRL No. B-67135) in separate treatments.

11. The method of claim 1 wherein the amount of the *Bacillus* strain is about $1.0 \times 10^3$ colony-forming units/liter of the wastewater to about $5.0 \times 10^{12}$ colony-forming units/liter of the wastewater.

12. The method of claim 1 wherein the wastewater is contacted with a mixture of *Bacillus* strain ALG (NRRL No. B-67134) and *Bacillus* strain DRT (NRRL No. B-67135), wherein each of said *Bacillus* strains produces a carboxymethylcellulase.

13. A method of treating wastewater by contacting the wastewater with a *Bacillus* strain to remove an organic compound, the method comprising contacting the wastewater with an isolated *Bacillus* strain selected from the group consisting of *Bacillus* strain ALG (NRRL No. B-67134), *Bacillus* strain DRT (NRRL No. B-67135), and combinations thereof, and removing the organic compound wherein the organic compound is removed by degradation and wherein at least one of the *Bacillus* strains has antimicrobial activity against bacteria selected from the group consisting of *E. coli, Salmonella, Staphylococcus, Enterococcus, Clostridia, Campylobacter*, and combinations thereof, wherein the *Bacillus* strains maintain growth activity at a temperature of 4° C. relative to the growth activity of the strains at 32° C.

14. The method of claim 13 wherein the wastewater is selected from the group consisting of industrial wastewater and sewage wastewater.

15. The method of claim 13 wherein the wastewater is selected from the group consisting of dairy pond wastewater, grease trap wastewater, sewage wastewater, industrial cooling water wastewater, tannery wastewater, wastewater from manufacturing a pharmaceutical, wastewater from manufacturing a pesticide, wastewater from manufacturing paper, wastewater from manufacturing oil or gas, plant wastewater, and wastewater from manufacturing food.

16. The method of claim 13 wherein the organic compound is selected from the group consisting of a pharmaceutical, a pesticide, a by-product of a tannery process, a by-product of paper manufacture, a by-product of pesticide manufacture, a by-product of oil or gas manufacture, a by-product of food manufacture, and a by-product of human waste.

17. The method of claim 13 wherein the *Bacillus* strain selected from the group consisting of *Bacillus* strain ALG (NRRL No. B-67134), *Bacillus* strain DRT (NRRL No. B-67135), and combinations thereof, produces an enzyme selected from the group consisting of a protease, an amylase, a xylanase, a cellulase, and combinations thereof.

18. The method of claim 17 wherein the enzyme is a cellulase and the cellulase is a carboxymethylcellulase.

19. The method of claim 13 wherein the wastewater is further treated with a *Bacillus* strain different from *Bacillus* strain ALG (NRRL No. B-67134) or different from *Bacillus* strain DRT (NRRL No. B-67135), or a lactic acid bacterial strain, and combinations of the different strains and the lactic acid bacterial strain that are used for further treatment.

20. The method of claim 13 wherein *Bacillus* strain ALG (NRRL No. B-67134) is selected as a sole *Bacillus* strain placed in contact with said wastewater.

21. The method of claim 13 wherein *Bacillus* strain DRT (NRRL No. B-67135) is selected as a sole *Bacillus* strain placed in contact with said wastewater.

22. The method of claim 13 wherein the wastewater is treated with a composition comprising *Bacillus* strain ALG (NRRL No. B-67134) and *Bacillus* strain DRT (NRRL No. B-67135) in combination in a single treatment.

23. The method of claim 13 wherein the wastewater is treated with *Bacillus* strain ALG (NRRL No. B-67134) and *Bacillus* strain DRT (NRRL No. B-67135) in separate treatments.

24. The method of claim 13 wherein the amount of the *Bacillus* strain is about $1.0 \times 10^3$ colony-forming units/liter of the wastewater to about $5.0 \times 10^{12}$ colony-forming units/liter of the wastewater.

25. A method of treating wastewater by contacting the wastewater with a *Bacillus* strain to remove an inorganic compound, the method comprising contacting the wastewater with an isolated *Bacillus* strain selected from the group consisting of *Bacillus* strain ALG (NRRL No. B-67134), *Bacillus* strain DRT (NRRL No. B-67135), and combinations thereof, and removing the inorganic compound by reducing the amount of the inorganic compound and wherein at least one of the *Bacillus* strains has antimicrobial activity against bacteria selected from the group consisting of *E. coli, Salmonella, Staphylococcus, Enterococcus, Clostridia, Campylobacter*, and combinations thereof, wherein the *Bacillus* strains maintain growth activity at a temperature of 4° C. relative to the growth activity of the strains at 32° C.

26. The method of claim 25 wherein the wastewater is selected from the group consisting of industrial wastewater and sewage wastewater.

27. The method of claim 25 wherein the wastewater is selected from the group consisting of dairy pond wastewater, grease trap wastewater, sewage wastewater, industrial cooling water wastewater, tannery wastewater, wastewater from manufacturing a pharmaceutical, wastewater from manufacturing a pesticide, wastewater from manufacturing paper, wastewater from manufacturing oil or gas, plant wastewater, and wastewater from manufacturing food.

28. The method of claim 25 wherein the inorganic compound is nitrogen or sulfur.

29. The method of claim 25 wherein the *Bacillus* strain selected from the group consisting of *Bacillus* strain ALG (NRRL No. B-67134), *Bacillus* strain DRT (NRRL No. B-67135), and combinations thereof, produces an enzyme selected from the group consisting of a protease, an amylase, a xylanase, a cellulase, and combinations thereof.

30. The method of claim 29 wherein the enzyme is a cellulase and the cellulase is a carboxymethylcellulase.

31. The method of claim 25 wherein the wastewater is further treated with a *Bacillus* strain different from *Bacillus* strain ALG (NRRL No. B-67134) or different from *Bacillus* strain DRT (NRRL No. B-67135), or a lactic acid bacterial strain, and combinations of the different strains and the lactic acid bacterial strain that are used for further treatment.

32. The method of claim 25 wherein *Bacillus* strain ALG (NRRL No. B-67134) is selected as a sole *Bacillus* strain placed in contact with said wastewater.

33. The method of claim 25 wherein *Bacillus* strain DRT (NRRL No. B-67135) is selected as a sole *Bacillus* strain placed in contact with said wastewater.

34. The method of claim 25 wherein the wastewater is treated with a composition comprising *Bacillus* strain ALG (NRRL No. B-67134) and *Bacillus* strain DRT (NRRL No. B-67135) in combination in a single treatment.

35. The method of claim 25 wherein the wastewater is treated with *Bacillus* strain ALG (NRRL No. B-67134) and *Bacillus* strain DRT (NRRL No. B-67135) in separate treatments.

36. The method of claim 25 wherein the amount of the *Bacillus* strain is about $1.0 \times 10^3$ colony-forming units/liter of the wastewater to about $5.0 \times 10^{12}$ colony-forming units/liter of the wastewater.

* * * * *